United States Patent [19]

Okada

[11] Patent Number: 5,402,179
[45] Date of Patent: Mar. 28, 1995

[54] NOISE DETECTOR AND NOISE REDUCTION DEVICE USING SYNTHETIC JUDGMENT

[75] Inventor: Teruo Okada, Fujioka, Japan
[73] Assignee: Kabushiki Kaisha Toshiba, Kawasaki, Japan
[21] Appl. No.: 51,882
[22] Filed: Apr. 26, 1993
[30] Foreign Application Priority Data Apr. 24, 1992 [JP] Japan .................................. 4-106828

[51] Int. Cl.$^6$ ............................................... H04N 5/21
[52] U.S. Cl. ...................................... 348/607; 348/622
[58] Field of Search .................... 358/36, 167; 382/14, 382/15; 395/20; H04N 5/213, 5/21; 348/618, 619, 620, 622, 623, 607

[56] References Cited

U.S. PATENT DOCUMENTS

| | | | |
|---|---|---|---|
| 4,050,084 | 9/1977 | Rossi | 358/31 |
| 4,242,704 | 12/1980 | Ito | 358/167 |
| 4,288,815 | 9/1981 | Miles | 348/620 |
| 4,561,022 | 12/1985 | Bayer | 348/622 |
| 4,768,094 | 8/1988 | Ichinoi | 358/167 |
| 4,825,289 | 4/1989 | Ohta | 348/620 |
| 4,833,537 | 5/1989 | Takeuchi | 348/620 |
| 5,185,664 | 2/1993 | Darby | 358/167 |
| 5,191,419 | 3/1993 | Wischermann | 348/620 |
| 5,210,798 | 5/1993 | Ekchion | 382/14 |

FOREIGN PATENT DOCUMENTS

| | | | |
|---|---|---|---|
| 208175 | 10/1985 | Japan | 358/167 |
| 0264178 | 12/1985 | Japan | 358/167 |
| 4040173 | 2/1992 | Japan | H04N 5/213 |
| 4040174 | 2/1992 | Japan | H04N 5/213 |
| 4278782 | 10/1992 | Japan | H04N 5/213 |

Primary Examiner—Victor R. Kostak
Assistant Examiner—Chris Grant
Attorney, Agent, or Firm—Foley & Lardner

[57] ABSTRACT

A detector including filters adapted so that a signal is inputted thereto to judge whether or not a noise signal is included, or to what extent such noise signal is included; and an operation unit for synthetically judging, on the basis of results that these filters have judged, whether or not a noise signal is included, or to what extent such noise signal is included, thus to automatically detect the quantity of noises included in the signal.

A noise reduction device operative to control the noise reduction operation on the basis of an output of this detector to suppress adverse effects resulting from the fact that noise reduction is implemented to a signal having a high SN ratio.

27 Claims, 8 Drawing Sheets

NOISE DETECTOR AND NOISE REDUCTION DEVICE USING SYNTHETIC JUDGMENT

BACKGROUND OF THE INVENTION

This invention relates to a detector for detecting noise included in a signal, and a device for carrying out noise reduction by using this noise detector.

In the case where a television, a VTR, or audio equipment, etc. carries out signal processing, noise is apt to take place particularly when recording and reproducing a signal. It was conventionally extremely difficult to theoretically discriminate between an original (primary) signal and a noise signal. For this reason, there did not exist a device for automatically detecting whether or not there is a noise signal, or to what extent a noise signal is included. Accordingly, the human being could only judge a reproduced voice or picture (pictorial image), etc. by natural senses.

In an apparatus for processing a video signal or an audio signal, etc., a noise reduction device is provided. Explanation will be given by taking an example of a conventional noise reduction device used in a VTR. As the representative of the noise reduction device, there are a noise canceller, a non-recursive comb filter, and a recursive comb filter. Their configurations are shown in FIGS. 1 to 3, respectively.

Figure 1:
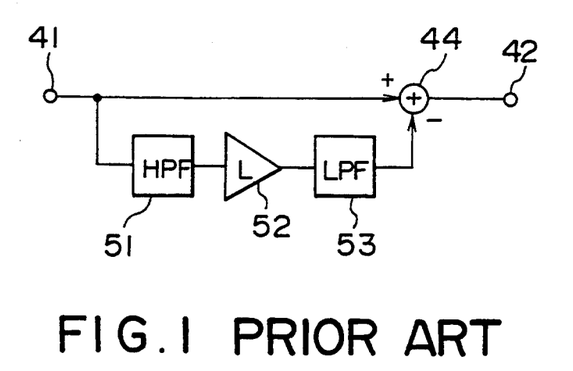
FIG. 1 is a block diagram showing the configuration of a conventional noise reduction device.

The noise canceller has a configuration as shown in FIG. 1. A signal inputted from an input terminal 41 is passed through a high-pass filter 51, a limiter 52 and a low-pass filter 53. In a predetermined frequency band determined by the high-pass filter 51 and the low-pass filter 53, the component of a very small level determined by the limiter 52 is extracted. This component is regarded as a noise signal. Such a noise signal is subtracted from the input signal at a subtracter 44 to output a signal indicating a difference therebetween from an output terminal 42. Generally, a frequency band which is disturbing the human eye is considered to be a frequency band in the vicinity of 1 MHz. Accordingly, an approach to eliminate very small components in this band is carried out.

Figure 2:
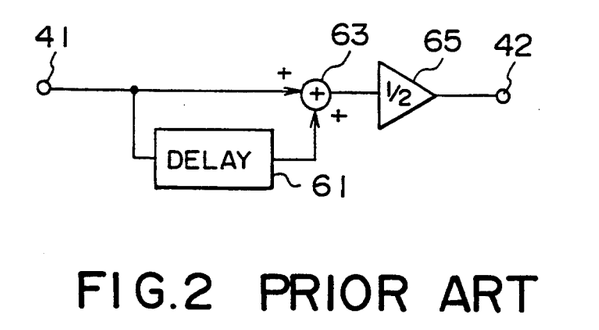
FIG. 2 is a block diagram showing the configuration of another conventional noise reduction device.

The non-recursive comb filter serves to suppress noise signals generated at random by using two signals correlative with each other, and has a configuration as shown in FIG. 2. A signal having correlation only for any one of one horizontal interval (time period), one field time period and one frame time period, like a VTR signal is delayed by a delay unit 61. A signal inputted from input terminal 41 is added to that delayed signal at an adder 63. A signal outputted from the adder 63 is then multiplied by ½ at an amplifier 65 so that its signal level is in correspondence with the original signal level for a second time. The signal thus obtained is outputted from output terminal 42. By using two signals correlative with each other, suppression can be made such that the level of noise generated at random without correlation becomes equal to $(\frac{1}{2})^{0.5}$.

Figure 3:
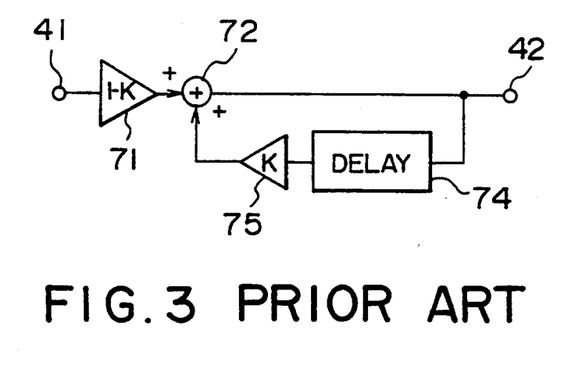
FIG. 3 is a block diagram showing the configuration of a further conventional noise reduction device.

The recursive comb filter also serves to suppress influence of a noise signal by using two signals correlative with each other, and has a configuration as shown in FIG. 3. A signal inputted from input terminal 41 is multiplied by $(1-K)$ $(0<K<1)$ by an amplifier 71. Further, another signal delayed by any of the above-described time periods at a delay circuit 74 is multiplied by K by an amplifier 75. A signal outputted from the amplifier 75 and a signal outputted from the amplifier 71 are added at an adder 72. An added signal thus obtained is outputted from output terminal 42.

However, even in the case where any noise reduction device is used, there was the problem that the picture quality of a reproduced picture is degraded. For example, in the noise canceller device, not only a noise signal but also an original signal component is included as very small component in a predetermined frequency band extracted by the high-pass filter 51, the limiter 52 and the low-pass filter 53. For this reason, the original signal component is subtracted from a signal together with the noise signal, resulting in lowered resolution.

In addition, in the case where the non-recursive filter or the recursive filter is used, such filter operates in the same manner also with respect to two signals which are not correlative with each other. For this reason, sagging or after-image may take place in a vertical direction of a picture.

Using these filters with respect to a signal having low SN ratio is effective for improvement in SN ratio. However, in the prior art, as described above, there was no device for automatically detecting whether or not there is a noise signal included in a signal, or to what extent such a noise signal is included therein. For this reason, noise reduction would be implemented to a signal already having a high SN ratio and does not strongly need noise reduction, leading to the adverse effect of lowering the resolution.

As stated above, there was in the prior art no device for automatically detecting whether or not there is a noise signal included in a signal, or to what extent such noise signal is included therein, so a human being could only judge such state of noise signal by eye or ear.

In addition, since the conventional noise reduction device does not include a function to automatically detect whether or not there is a noise signal, or to what extent such noise signal is included therein, noise reduction would be implemented to all signals irrespective of SN ratio, leading to the adverse effect that the picture quality or the sound quality is lowered.

SUMMARY OF THE INVENTION

Accordingly, an object of this invention is to provide a noise detector capable of automatically detecting whether or not there is a noise signal, or to what extent such noise signal is included therein, and provide a noise reduction device using such noise detector.

In accordance with this invention, there is provided a noise detector comprising: at least two filters adapted so that a signal is inputted thereto to judge whether or not a noise signal is included in the signal, or to what extent such noise signal is included in the signal; and an operation unit adapted for synthetically judging, on the basis of results that the filters have respectively judged, whether or not the noise signal is included in the signal, or to what extent such noise signal is included in the signal to output a judgment result.

In operation, at least two filters judge whether or not a noise signal is included in an inputted signal, or to what extent such noise signal is included therein. On the basis of respective judgment results, the operation unit synthetically judges presence or absence of a noise signal or the degree of such noise signal included. Thus, it is possible to precisely and automatically carry out detection of a noise signal.

Here, at least one of the above-mentioned filters may be a filter adapted for making a judgment such that the component within a predetermined band and below a predetermined level is considered to be the noise signal.

Moreover, at least One of the above-mentioned filters may be a filter operative to delay another signal correlative with the above-mentioned signal to make a judgment such that a component having no correlation between the delayed another signal and the above-mentioned signal is considered to be the noise signal, or a filter operative to delay another signal correlative with the above-mentioned signal to make a judgment such that a component below a predetermined level of the component having no correlation therebetween is considered to be the noise signal.

As stated above, in dependency upon what component included in a signal is considered to be a noise signal when the filter carries out detection of a noise signal, the criterion of judgment varies. Thus, in dependency upon the requirement, e.g., a component within a predetermined frequency band and below a predetermined level may be considered to be a noise signal, or another signal having correlation may-be used to consider a component having no correlation with another signal to be a noise signal.

Further, when the above-mentioned signal is a video signal, the noise detector may further includ a filter for judging whether or not the brightness of a picture that the video signal indicates has a level less than a predetermined level. In the case where the noise detector further includes such filter, it is possible to judge whether or not a noise signal is in a conspicuous state.

As the operation unit, there may be employed an operation unit using a logic circuit, or an operation unit using a neural network system.

In the case where the number of filters is small, a logic circuit is used as the operation unit, thereby making it possible to reduce the circuit scale. In contrast, in the case where the number of filters is great, a neural network system is used, thereby making it possible to reduce the circuit scale.

On the other hand, a noise reduction device of this invention is characterized by the provision of a noise canceller unit adapted so that a signal is inputted thereto to output a signal component obtained by subtracting, from the inputted signal, a component within a predetermined frequency band of the signal and below a predetermined level, a noise detector having a configuration as described above, and control means for controlling the characteristic of the noise canceller unit on the basis of a result that the operation unit has judged provided in the noise detector.

This noise reduction device is operative to control the characteristic of the noise canceller unit by using the control means on the basis of the judgment result of the noise detector, thereby making it possible to carry out a suitable noise canceller operation in dependency upon whether or not there is a noise signal, or to what extent such noise signal is included therein.

In place of the control means, there may be provided switching means such that when the operation unit has judged that the noise signal is included in the signal, or when the operation unit has judged that the degree of the noise signal included in the signal is above a predetermined level, the switching means allows the noise canceller unit to be operative, while when the operation unit has judged that the noise signal is not included in the signal, or when the operation unit has judged that the degree of the noise signal included in the signal is not above the predetermine level, the switching means allows the noise canceller device to be inoperative.

When it has been judged by the noise detector that no noise signal exists in a signal, or the degree of a noise signal included therein is small, the noise canceller unit is caused to be inoperative by using the switching means, whereby adverse effects rendered by the noise canceller are effectively suppressed.

In addition, the noise reduction device may include a comb filter in place of the noise canceller unit.

DESCRIPTION OF THE REFERRED EMBODIMENTS

Preferred embodiments of this invention will now be described with reference tom the attached drawings. The configuration of a noise detector according to a first embodiment of this invention is shown in a block form in FIG. 4. A signal inputted from an input terminal 11 is inputted to each of various filters 1, 2, 3, - - -. In these filters 1, 2, 3, - - -, criteria for judging whether or not there is a noise signal included in a signal, and for judging whether or not a noise signal is in a conspicuous state with respect to the human eye are caused to be different from each other as described later. Thus, results that the filters 1, 2, 3, - - - have judged on the basis of criteria set in advance are respectively output from the filters 1, 2, 3 - - -. Respective judgment results from these filters are inputted to an operation unit 13. The operation unit 13 operates as follows. Namely, when these plural judgment results are given to the operation unit 13, it synthetically judges presence or absence of a noise signal, or the degree of that noise signal included, thus to output a final judgment result from an output terminal 12.

Figure 4:
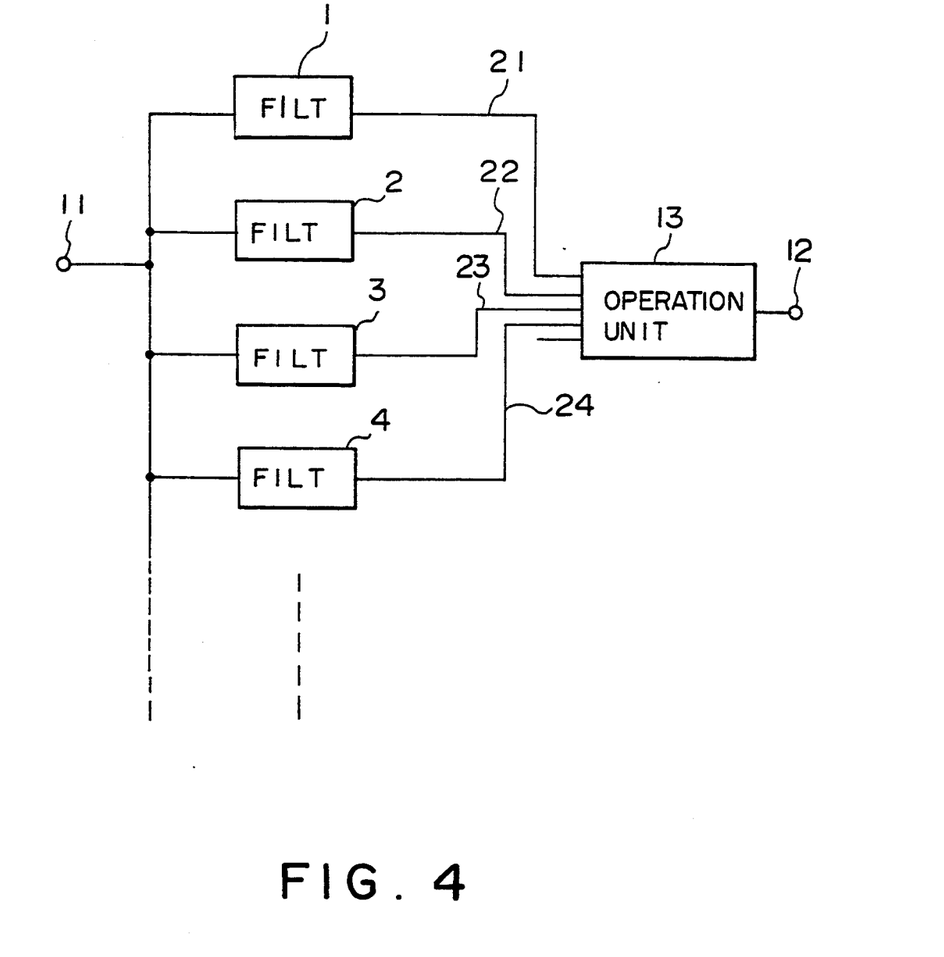
FIG. 4 is a block diagram showing the configuration of a noise detector according to a first embodiment of this invention.

As described above, in accordance with the first embodiment, whether or no a noise signal exists, or whether or not a noise signal is in a conspicuous state is judged on the basis of each of the criteria in various filters. On the basis of these judgment results, such situation of the noise signal is synthetically judged at the operation unit 13. Thus, this noise detector can automatically and precisely judge whether or not there is noise, or to what extent such noise is included.

Figure 5:
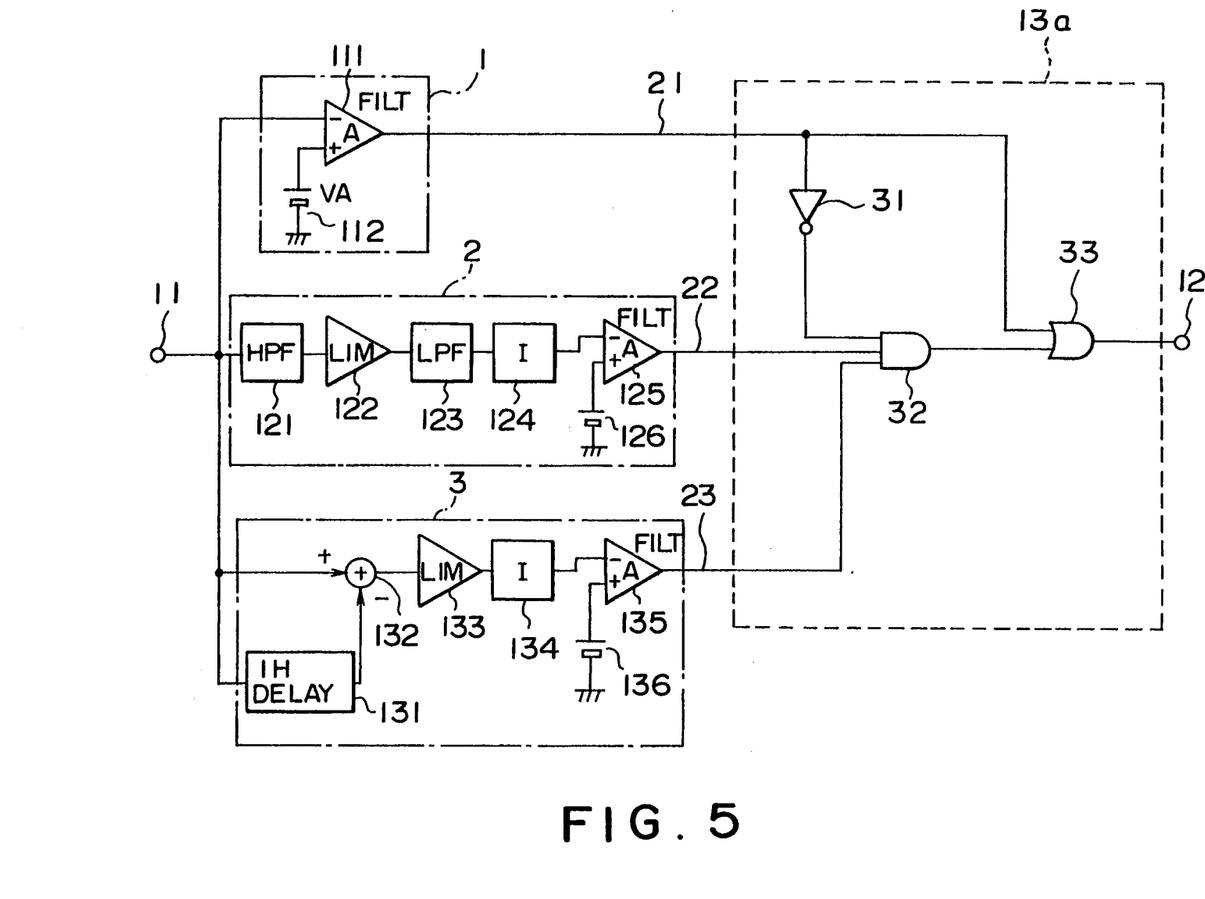
FIG. 5 is a block diagram showing the configuration of a noise detector according to a second embodiment of this invention.

The configuration of a second embodiment presented as a more practical form of the first embodiment is shown in FIG. 5. In FIG. 5, the same reference numerals as those of FIG. 4 indicate corresponding components, respectively.

Filter 1 serves to judge on the basis of brightness of a picture whether or not noise is in a conspicuous state. This is based on the fact that even noises have levels similar to each other, they become conspicuous to the human eye as the picture becomes darker. At a comparator 111, the level of a signal inputted from input terminal 11 and a reference voltage VA given by a reference voltage source 112 are compared with each other. As a result, when the level of the signal is less than the reference voltage VA, the current (present) state of noise is considered to be in a conspicuous state, whereby a signal of logic "1" level is outputted to a node 21. When otherwise, a signal of logic "0" level is outputted.

Filter 2 serves to consider a very small signal in a frequency band in the vicinity of 1 MHz where a noise signal is conspicuous to be a noise signal to judge whether or not the degree of such noise signal included is higher than a predetermined level. In this filter 2, a high-pass filter 121, a low-pass filter 122, a limiter 123, an integrator 124, and a comparator 125 are connected in series. By the high-pass filter 121, the low-pass filter 123, and the limiter 122, a very small signal component included in a predetermined frequency band is extracted. The very small signal component thus obtained is considered to be a noise signal to integrate this noise signal for a predetermined time. The integrated value is compared with a reference value given by a reference voltage source 126 at the comparator 125 to output a comparison result to a node 22. In this example, when it is judged that the integrated value is above a reference value, i.e., the degree of a noise signal included is above a predetermined level, a signal of logic "1" level is outputted.

Filter 3 serves to make a comparison between two signals correlative with each other to judge whether or not there is a noise signal. One of signals correlative with each other is delayed at a delay unit 131. This delay time corresponds to any one of the one horizontal time period, the one field time period and the one frame time period. This delayed one signal is subtracted from the other signal which is not delayed at a subtracter 132, resulting in a signal having no correlation. This signal is outputted to a limiter 133. Although an original signal component is also included in this signal, there are many instances where such component has a level above a predetermined level. In view of this, a very small component which has been passed through the limiter 133 is considered to be a noise signal. Such noise signal is outputted to an integrator 134. At the integrator 134, the inputted signal component is integrated for a predetermined time. The integrated value thus obtained is outputted to a comparator 135. The comparator 135 makes a comparison between the output integrated value and a deference value given by a reference voltage source 136 to output a comparison result to a node 23. Also in this filter 3, similarly to the filter 2, when the integrated value is above a reference value, a signal of logic "1" level is outputted.

Outputs from the filters 1–3 are inputted to an operation unit 13a. This operation unit 13a includes an inverter 31, an AND circuit 32, and an OR circuit 33. To three input terminals of the AND circuit 32, the node 22, the node 23, and the node 21 through the inverter 31 are respectively connected. To two input terminals of the OR circuit 33, the node 21 and the output terminal of the AND circuit 32 are respectively connected. In addition, the output terminal of the DR circuit 33 is connected to the output terminal 12.

The relationship of levels of input/output signals of the operation unit 13a is shown in the following table.

| INPUT (FILTER 1) | 0 | 1 | 0 | 0 | 1 | 1 | 0 | 1 |
|---|---|---|---|---|---|---|---|---|
| INPUT (FILTER 2) | 0 | 0 | 1 | 0 | 1 | 0 | 1 | 1 |
| INPUT (FILTER 3) | 0 | 0 | 0 | 1 | 0 | 1 | 1 | 1 |
| OUTPUT (12) | 0 | 1 | 0 | 0 | 1 | 1 | 1 | 1 |

The relationship of the input/output level is as follows. When a signal of logic "1" level is outputted from the filter 1, the picture is in a dark state such that its brightness is less than a predetermined level. This state is where a noise signal is conspicuous. Thus, when either filter 2 or filter 3 judges that a noise signal exists to output a signal of logic "1" level, the operation unit 13a outputs a signal of logic "1" level. When a signal of "0" level is outputted from filter 1, the noise signal is in the state where it is not conspicuous. Thus, only when filters 2 and 3 both output a signal of logic "1" level, the operation unit 13a outputs a signal of logic "1" level. As stated above, in accordance with the second embodiment, whether or not a noise signal is in a conspicuous state is judged by the filter 1; presence or absence of a noise signal is judged by the filter 2 in dependency upon whether or not the degree of a very small component included in a predetermined frequency band is above a predetermined level; and whether or not the degree of a random noise signal of a predetermined level existing is above a predetermined level is judged by using two signals correlative with each other by the filter 3. Then, the operation unit 13a synthetically judges, on the basis of respective judgment results of the filters 1–3, whether or not there is a noise signal. In a manner stated above, i judgment results by plural filters having different criteria are used to synthetically judge the degree of a noise signal included, thereby making it possible to precisely and automatically whether or not there is a noise signal.

Figure 6:
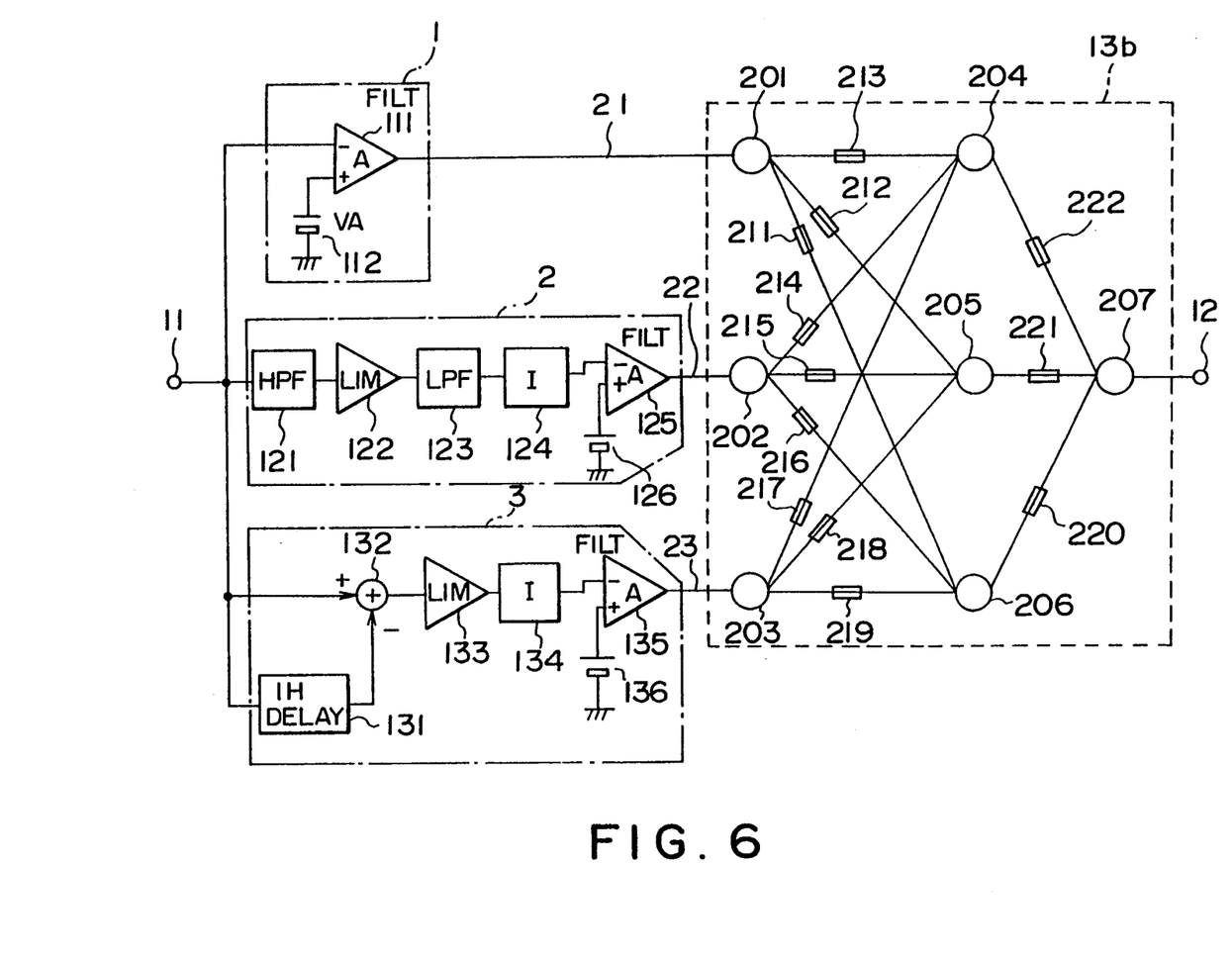
FIG. 6 is a block diagram showing the configuration of a noise detector according to a third embodiment of this invention.

A third embodiment of this invention will now be described with reference to FIG. 6. This embodiment is the same as the second embodiment in the configurations of filters 1-3, but differs from the second embodiment in the configuration of an operation unit 13b. In the second embodiment, the operation unit 13a is constituted with a logic circuit. One the contrary, the operation unit 13b in the third embodiment is constituted with a neural network system of three layers.

The neural network system has been put into practice in recent years. In this system, a large number of simple operation elements are used to artificially realize action of neuron of the brain. Input signals are given to a neural network system to allow the system to carry out learning so that desired output signals are obtained with respect to input signals. By repeatedly applying input signals to the neural network system until such desired output signals or results close to desired output signals are obtained, weighting coefficient groups are determined. As such an algorithm, back propagation is most popular.

This operation unit 13b includes neurons 201-207, and synapses 211-222 provided between signal lines connecting respective neurons 201-207. The neurons 201-203 constitute an input layer, the neurons 204-206 constitute an intermediate layer, and the neuron 207 constitutes an output layer. The neurons 201-207 are an operator adapted for adding all of data respectively inputted to output, e.g., logic "1" when the added value is above a threshold value. The synapses 211-222 serve to vary strength coupling respective neurons 201-207 and multiply data flowing in a signal line by weighting coefficients. Back propagation learning is carried out so that the weighting coefficients of respective synapses 211-222 are optimum. In actual terms, a video signal is inputted to the input terminal 11 of this embodiment. Filter 1 judges whether or not a noise signal is in a conspicuous state. Filters 2 and 3 judge whether or not the degree of a noise signal included is above a predetermined level. Respective judgment results of the filters 1-3 are inputted to the operation unit 13b, and output results are outputted from output terminal 12. Back propagation is carried out so that these output results become close to desired values. Thus, weighting coefficients of respective synapses 211-222 are varied and are finally determined.

The neural network system is effective in the case of concurrently processing many data to carry out synthetic judgment. For this reason, in the case where the number of filters is great, the operation unit 13b using the neural network system in the second embodiment is more suitable than the operation unit 13a constituted with logic circuit as in the first embodiment. For example, provision of a plurality of filters 1 including comparators 111 having different reference potentials is also effective. Similarly, there may be employed a circuit configuration such that there are provided a plurality of filters 2 in which the frequency band determined by the high-pass filter 121 and the low-pass filter 123, the integration time of the integrator 124, the reference potential of the comparator 125, and the reference potential of the limiter 124 are different, and that there are provided a plurality of criteria of the noise level, thereby making it possible to give a plurality of input signals to the operation unit.

In addition, in the case where such a neural network system is used, there is the merit that a desired output signal is obtained also when an unknown input signal is given. In the process of carrying out back propagation learning, a plurality of input/output signals are given, so weighting coefficients are determined. Also in the case where an unknown signal is inputted after learning, desired signals are outputted by the learning effect.

While operation unit 13b constituted with the neural network system of the back propagation type is used in the third embodiment, other systems may be used for this purpose. If the hop field network system, the system for conducting learning by the vector quantization method, the system of the Boltzmann type, the RCE network system, or the system of the Neo-cognitron type, etc. are used, similar advantages can be provided.

Further, as the operation unit of the logic circuit structure, in addition to the operation units shown in the first and second embodiments, any operation unit may be employed such that data outputted from a plurality of filters are used, thus making it possible to synthetically judge whether or not there is a noise signal. For example, there may be used a microcomputer, etc. in which a designer can make programming so that a desired input/output relationship is provided.

In the above-described second and third embodiments, signals inputted and outputted to and from the operation units 13a, 13b take a digital form. However, there may be employed an operation unit adapted so that an analog signal is inputted thereto and is outputted therefrom. In this case, the degree of a noise signal is displayed in a non-step manner, i.e., in a continuous manner, in place of presence or absence of a noise signal.

A noise reduction device according to a fourth embodiment of this invention will now be described. The configuration of this embodiment is shown in a block form in FIG. 7. Between an input terminal 41 and an output terminal 42, a noise reduction unit 95 and control means 96 for controlling the operation of the noise reduction unit 95 are provided. Further, there is provided a noise detector 43 having an input terminal connected to the input terminal 41 and an output terminal connected to the control means 96. As the noise detector 43, any one of the noise detectors according to the first to third embodiments may be used. On the basis of presence or absence of a noise signal, or the degree of a noise signal included that the noise detector 43 has judged, the control means 96 controls the operation of the noise reduction unit 95.

Figure 7:
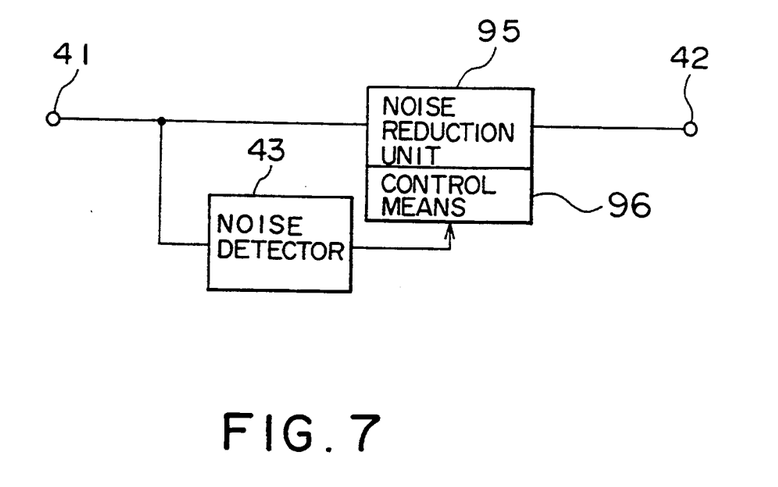
FIG. 7 is a block diagram showing the configuration of a noise reduction device according to a fourth embodiment of this invention.

As described above, conventional noise reduction devices implemented noise reduction to all signals irrespective of SN ratio of an input signal. This resulted in adverse effects such as lowering of the picture quality in the case where SN ratio of a signal is high. In view of this, in the noise reduction device of the fourth embodiment, an approach is employed to detect, by using noise detector 43, whether or not there is a noise signal included in an input signal or to what degree a noise signal is included therein, thus to carry out switching between an operative state and an inoperative state of the noise reduction unit 95, or to vary the intensity of the noise reduction effect in dependency upon the result. Thus, when the SN ratio of an input signal is high, it is possible to output an input signal as it is without allowing the noise reduction unit 95 to be operative, or to weaken the noise reduction effect, thus to allow minimizing effects that degrade a signal.

An embodiment presented as a more practical form of the noise reduction device according to the fourth embodiment will be referred to below. The configuration of a device according to a fifth embodiment of this invention is in a block form in FIG. 8. The noise reduction device of the fifth embodiment further includes, in addition to high-pass filter 51, limiter 52, low-pass filter 53, and subtracter 44 which are shown in FIG. 1, noise detector 43 in the fourth embodiment and a gain control amplifier (hereinafter referred to as a GCA) 54. The GCA 54 is connected to the succeeding stage of the low-pass filter 53, and the output terminal of the GCA 54 is connected to the input terminal on the negative side of the subtracter 44. The output terminal of the noise detector 43 is connected to the control terminal of the GCA 54.

Figure 9:
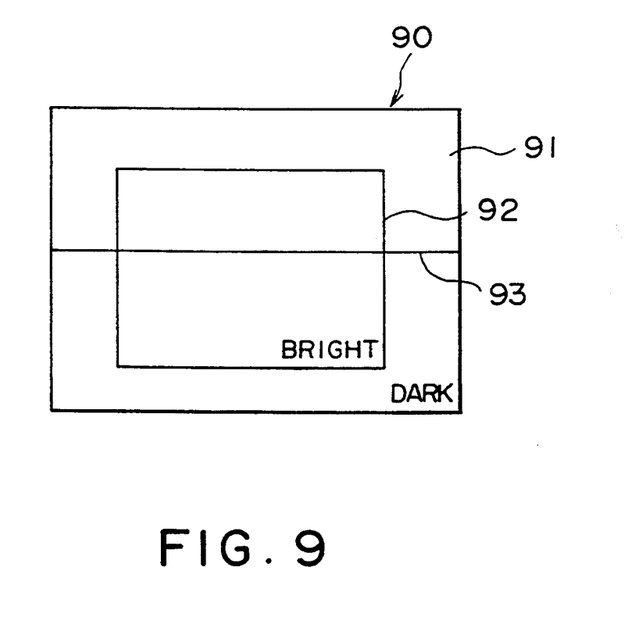
FIG. 9 is an explanatory view showing arrangement of bright and dark portions on a picture and signal lines constituting the picture.
Figure 10:
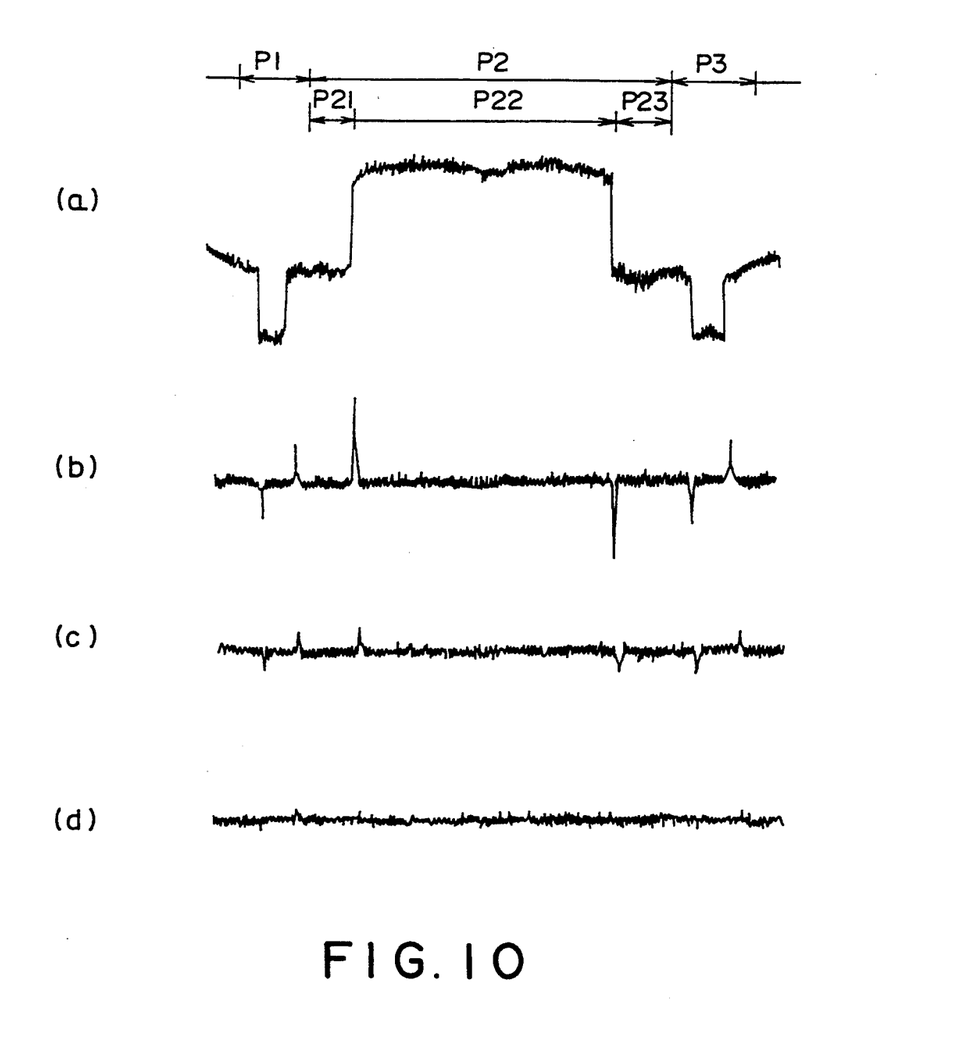
FIG. 10 is a waveform diagram showing changes in the waveform when an input signal is passed through a high-pass filter, a limiter and a low-pass filter in order recited.

When a signal is inputted from the input terminal 41, and is passed through high-pass filter 51, limiter 52, and low-pass filter 53 in order recited, the signal waveform sequentially changes. In FIG. 9, it is assumed that a portion 92 which is White and has high brightness is present at the central portion of a picture 90, and a portion 91 which is black and has a lower brightness is present therearound. A Signal 93 shown of signals constituting such picture 90 has a waveform as shown in FIG. 10(a). In this figure, signals at the time periods P1 and P3 are a synchronizing signal, and a video signal constituting a picture appears at the time period P2.

At the stage where a signal is inputted to the input terminal 41, high frequency and low frequency noise components are included as Shown in FIG. 10(a). When the signal is passed through the high-pass filter 51, the low frequency component is removed as shown in FIG. 10(b). When further passed through the limiter 52, a component above a predetermined level is eliminated as shown in FIG. 10(c). After passing through the low-pass filter 53, the high frequency component is eliminated as shown in FIG. 10(d). The signal Which has been passed through the low-pass filter 53 is mainly constituted with a noise signal conspicuous on a picture, but includes an original signal to some extent.

Figure 8:
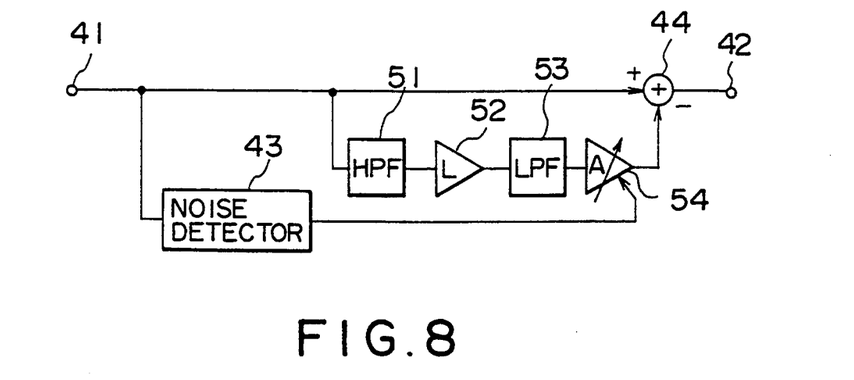
FIG. 8 is a block diagram showing the configuration of a noise reduction device according to a fifth embodiment of this invention.

In view of this, the noise detector 43 is used to judge whether or not there is a noise, or to what extent such noise is included to vary the gain A of the GCA 54 in dependency upon the judgment result. In the case where the SN ratio of a signal is low, i.e., there are a great quantity of noises, the gain A is set to a large value close to 1. Thus, a Signal outputted from the low-pass filter 53 is multiplied by gain A at the GCA 54. The multiplied signal thus obtained is subtracted from an input signal at the subtracter 44. As a result, a more enhanced noise reduction effect is obtained. In the case where SN ratio of a signal is high, the gain A is set to a small value, thus to employ an approach such that a signal outputted from the low-pass filter 53 is not subtracted so much from an input signal.

Figure 11:
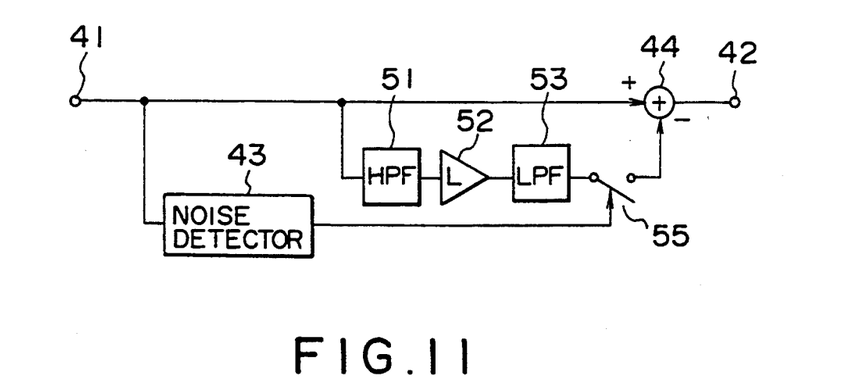
FIG. 11 is a block diagram showing the configuration of a noise reduction device according to a sixth embodiment of this invention.

A noise reduction device according to a sixth embodiment of this invention is shown in FIG. 11. This embodiment is characterized in that GCA 54 in the fifth embodiment is replaced by a switch 55. This switch 55 is turned ON when the noise detector 43 has judged that the quantity of noises is great. Thus, a noise signal is eliminated from a signal. In contrast, when the noise detector 43 has judged that the quantity of noises is small, the switch 55 is turned OFF. As a result, noise reduction is not carried out. Thus, the adverse effect given by noise reduction is suppressed.

Figure 12:
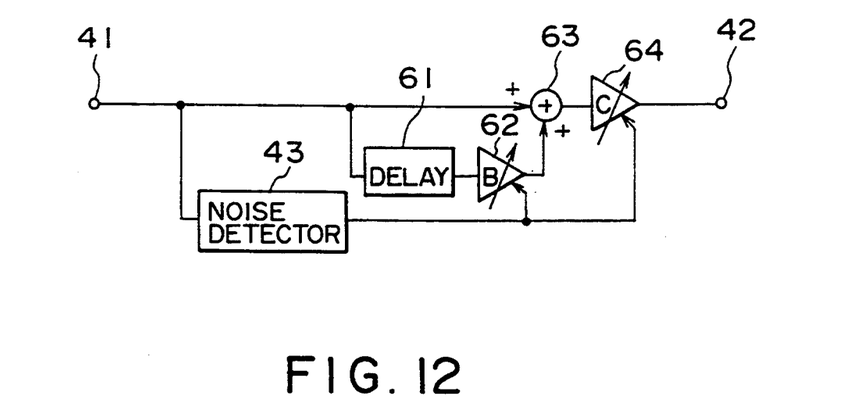
FIG. 12 is a block diagram showing the configuration of a noise reduction device according to a seventh embodiment of this invention.

The configuration of a noise reduction device according to a seventh embodiment is shown in FIG. 12. In this embodiment, a non-recursive comb filter comprised of a delay unit 61 and an adder 63 is used. The comb filter uses two signals correlative with each other to compress a non-correlative random noise signal. In this filter, a signal delayed by any one of the one horizontal time period, one field time period and the one frame time period is used.

As the succeeding stage of the delay unit 61, a GCA 62 is provided. At the succeeding stage of the adder 63, a GCA 64 is provided. The gain B of the GCA 62 and the gain C of the GCA 64 are Controlled in accordance with the quantity of noises that the noise detector 43 has detected. In this case, respective gains B and C are controlled so that there holds the relationship expressed as $(1+B)-C=$constant indicating that the level of a signal outputted from the output terminal 42 is fixed.

A signal inputted from the input terminal 41 and a signal delayed by the delay unit 61 and multiplied by gain B are added at an adder 63. The added value is multiplied by gain C. The multiplied signal thus obtained is output from the output terminal 64. In the case where the noise detector 43 has judged that many noise signals are included, gain B is set to a large value close to 1. In contrast, in the case where the noise detector 43 has judged that many noise signals are not included, gain B is set to a small value.

Figure 13:
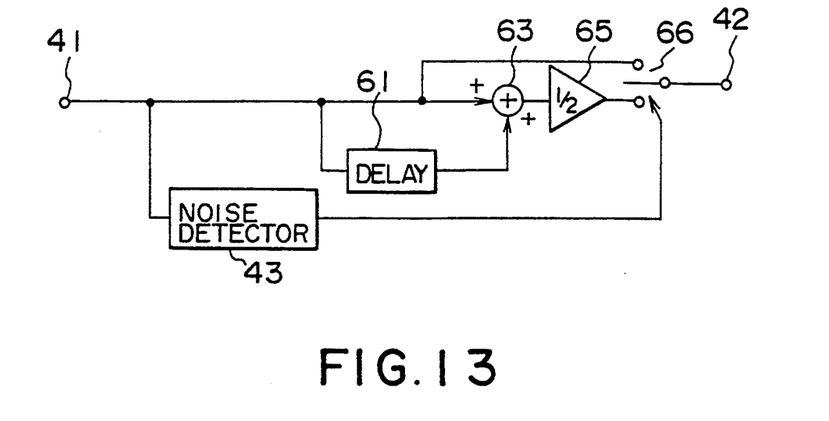
FIG. 13 is a block diagram showing the configuration of a noise reduction device according to an eighth embodiment of this invention.

An eighth embodiment Shown in FIG. 13 uses a non-recursive comb filter similarly to the seventh embodiment, but differs from the latter in that a switch 66 is used in place of GCAs 62 and 64 to control ON/OFF operation of the filter in dependency upon the quantity of noises.

When the noise detector 43 has judged that the quantity of noises is smaller than a predetermined quantity, the switch 66 is turned OFF to directly output an inputted signal without applying noise reduction thereto. In contrast, when the noise detector 43 has judged that the quantity of noises is great, the switch 66 is turned ON to carry out noise reduction as follows. Namely, a signal delayed by the delay circuit 61 and a signal which is not delayed are added at the same level at adder 63. By using an amplifier 65 having gain of $\frac{1}{2}$ with respect to the added signal, the level of a signal is in correspondence with an ordinary level for a second time, and the level of a non-correlative noise signal is reduced to $(\frac{1}{2})^{0.5}$.

Figure 14:
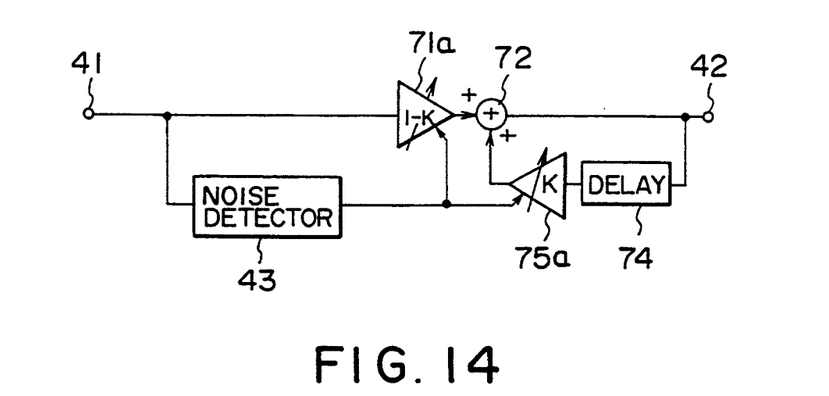
FIG. 14 is a block diagram showing the configuration of a noise reduction device according to a ninth embodiment of this invention.

The configuration of a ninth embodiment of this invention using a recursive comb filter is shown in FIG. 14. In this embodiment, a recursive coefficient K indicating the degree of the effect of the recursive comb filter is controlled in dependency upon the quantity of noises. When compared to the recursive comb filter shown in FIG. 12, this recursive comb filter differs from the former in that amplifiers 64 and 62 are replaced by GCAs 71a and 75a, respectively.

The quantity of noises included in an input signal is detected by the noise deflector 43. In dependency upon detection result, the gain K of the GCA 75a and the gain $(1-K)$ of the GCA 71a vary. In the case where it is judged that the quantity of noises is great, the gain K is set to a large value close to 1. In contrast, in the case where it is judged that the quantity of noises is small, the gain K is set to a small value. A signal delayed by a delay unit 74 and multiplied by gain K is added to a signal multiplied by the gain $(1-K)$ at an adder 72. The added signal thus obtained is outputted.

Figure 15:
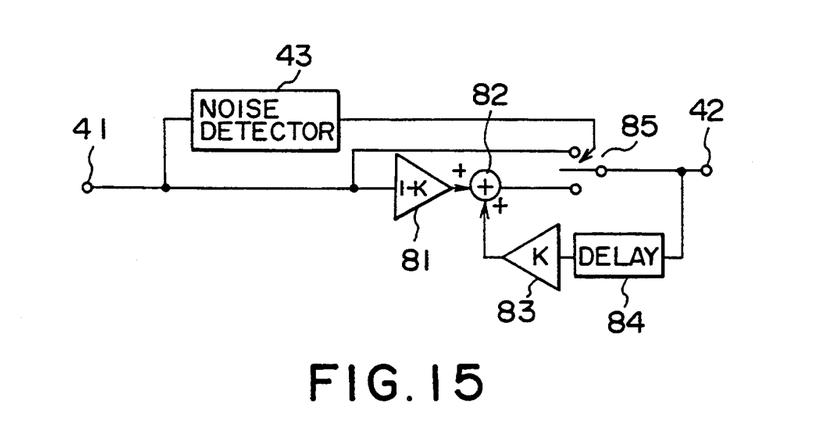
FIG. 15 is a block diagram showing the configuration of a noise reduction device according to a tenth embodiment of this invention.

A tenth embodiment shown in FIG. 15 differs from the ninth embodiment in that the operation of the recursive comb filter is caused to be turned ON and OFF in dependency upon the quantity of noises by using a switch 85. At the noise detector 43, the quantity of noises is detected. When the quantity of noises is small, the switch 85 is turned OFF, so an input signal is outputted as it is. In contrast, when the quantity of noises is great, this device operates similarly to the device of FIG. 12. Namely, an inputted signal is multiplied by the gain 1−K. Then, a signal delayed and multiplied by gain K is added to the above-mentioned multiplied signal. The added signal thus obtained is outputted.

As stated above, the noise reduction devices according to the fourth to eighth embodiments of this invention all control the operations of various filters in dependency upon an output of the noise detector 43. However, it should be noted that the connection relationship such as arrangement of GCAs or switches in the respective embodiments are not limited to those implementations. There may be employed any connection relationship such that the noise reduction effect is permitted to be controlled in dependency upon the quantity of noises, or the noise reduction operation is caused to be turned ON or OFF.

In addition, units controlled or turned ON/OFF by the noise detector 43 are not limited to the noise reduction units according to the embodiments, but may be used in all noise reduction units or other systems for which measure of noise is required.

What is claimed is:

1. A noise detector comprising:
   at least two filters adapted so that a signal is inputted thereto to judge whether or not a noise signal is included in said input signal; and
   an operation unit adapted for synthetically judging, on the basis of results that said filters have respectively judged, whether or not said noise signal is included in said input signal, thus to output a judgment result, wherein at least what one of said filters carries out a judgment such that a component within a predetermined frequency band of said input signal and below a predetermined level is considered to be said noise signal.

2. A noise detector comprising:
   at least two filters adapted so that a signal is inputted thereto to judge whether or not a noise signal is included in said input signal; and
   an operation unit adapted for synthetically judging, on the basis of results that said filters have respectively judged, whether or not said noise signal is included in said input signal, thus to output a judgment result, wherein at least one of said filters is operative to delay another signal correlative with said input signal to carry out a judgment such that a component having no correlation between the delayed another signal and said input signal is considered to be said noise signal.

3. A noise detector comprising:
   at least two filters adapted so that a signal is inputted thereto to judge whether or not a noise signal is included in said input signal;
   an operation unit adapted for synthetically judging, on the basis of results that said filters have respectively judged, whether or not said noise signal is included in said input signal, thus to output a judgment result, wherein at least one of said filters is operative to delay another signal correlative with said input signal to extract a component having no correlation between the delayed another signal and said input signal to carry out a judgment such that a component less than a predetermined level of the extracted component is considered to be said noise signal.

4. A noise detector comprising:
   at least two filters adapted so that a signal is inputted thereto to judge whether or not a noise signal is included in said input signal; and
   an operation unit adapted for synthetically judging, on the basis of results that said filters have respectively judged, whether or not said noise signal is included in said input signal, thus to output a judgement result, wherein when said input signal is a video signal, said noise detector further comprises a filter adapted for making a comparison between brightness of a picture indicated by said video signal and a predetermined value to output a comparison result,
   said operation unit being operative to synthetically judge, on the basis of results that said filters have respectively judged, whether or not said noise signal is included in said input signal, thus to output a judgment result.

5. A noise detector comprising:
   at least two filters adapted so that a signal is inputted thereto to judge whether or not a noise signal is included in said input signal; and
   an operation unit adapted for synthetically judging, on the basis of results that said filters have respectively judged, whether or not said noise signal is included in said input signal, thus to output a judgment result, wherein said operation unit is constituted with a neural network system comprising a plurality of neurons, and a plurality of synapses for setting strengths coupling said respective neurons.

6. A noise detector comprising:
   at least two filters adapted so that a signal is inputted thereto to judge whether or not a noise signal is included in said input signal; and
   an operation unit adapted for synthetically judging, on the basis of results that said filters have respectively judged, whether or not said noise signal is included in said input signal, thus to output a judgment result, wherein said operation unit comprises:
   a plurality of first neurons adapted so that results that said filters have respectively judged are given thereto to respectively compare them with predetermined criteria to output first comparison results;
   a plurality of first synapses adapted for setting strengths coupling said first neurons and a plurality of second neurons by carrying out weighting, said plurality of second neurons adapted so that said first comparison results outputted from said first neurons and weighted by said first synapses are respectively given thereto to respectively compare them with predetermined criteria to output second comparison results; and
   a plurality of second synapses adapted for setting strengths coupling said second neurons and a third neuron by carrying out weighting, the third neuron adapted so that said second comparison results outputted from said second neurons and weighted by said second synapses are given thereto to compare them with a predetermined criterion to synthetically judge whether or not said noise signal is included in said input signal to output a judgment result.

7. A noise reduction device comprising:
   a noise canceller unit adapted so that a signal is inputted thereto to output a signal obtained by subtracting, from said input signal, a component within a predetermined frequency band of said input signal and below a predetermined level;

a noise detector including at least two filters adapted so that said input signal is inputted thereto to judge whether or not a noise signal is included in said input signal, and an operation unit for synthetically judging, on the basis of results that said filters have respectively judged, whether or not said noise signal is included in said input signal; and control means for controlling a characteristic of said noise canceller unit on the basis of a result that said operation unit has judged.

8. A noise reduction device comprising:

a noise canceller unit adapter so that a signal is inputted thereto to output a signal obtained by subtracting, from said input signal, a component within a predetermined frequency band of said input signal and below a predetermined level;

a noise detector including at least two filters adapted so that said input signal is inputted thereto to judge whether or not a noise signal is included in said input signal, and an operation unit for synthetically judging, on the basis of results that said filters have respectively judged, whether or not said noise signal is included in said input signal; and switching means operative such that when said operation unit has judged that said noise signal is included in said input signal, said switching means allows said noise canceller unit to be operative, while when said operation unit has judged that said noise signal is not included in said input signal, said switching means allows said noise canceller unit to be inoperative.

9. A noise reduction device comprising:

a comb filter adapted so that a signal is inputted thereto to output a signal obtained by compressing a non-correlative component by using another signal correlative with said input signal;

noise detector including at least two filters adapted so that said input signal is inputted thereto to judge whether or not a noise signal is included in said input signal, and an operation unit for synthetically judging, on the basis of results that said filters have respectively judged, whether or not said noise signal is included in said input signal; and control means for controlling a characteristic of said comb filter on the basis of a result that said operation unit has judged.

10. A noise reduction device comprising:

a comb filter adapted so that a signal is inputted thereto to output a signal obtained by compressing a non-correlative component by using another signal correlative with said input signal;

a noise detector including at least two filters adapted so that said input signal is inputted thereto to judge whether or not a noise signal is included in said input signal, and an operation unit for synthetically judging, on the basis of results that said filters have respectively judged, whether or not said noise signal is included in said input signal; and switching means operative such that when said operation unit has judged that said noise signal is included in said input signal, said switching means allows said comb filter to be operative, while when said operation unit has judged that said noise signal is not included in said input signal, said switching means allows said comb filter to be inoperative.

11. A noise detector comprising:

at least two filters adapted so that a signal is inputted thereto to judge to what extent a noise signal is included in said input signal; and an operation unit adapted for synthetically judging, on the basis of results that said filters have respectively judged, to what extent said noise signal is included in said input signal and for outputting a judgment result, wherein when said input signal is a video signal, said noise detector further comprises a filter adapted for making a comparison between brightness of a picture indicated by said video signal and a predetermined value to output a comparison result, said operation unit being operative to synthetically judge, on the basis of results that said filters have respectively judged, to what extent said noise signal is included in said input signal and to output a judgment result.

12. A noise detector comprising:

at least two filters adapted so that a signal is inputted thereto to judge to what extent a noise signal is included in said input signal; and an operation unit adapted for synthetically judging, on the basis of results that said filters have respectively judged, to what extent said noise signal is included in said input signal and for outputting a judgment result, wherein said operation unit includes a neural network system comprising a plurality of neurons, and a plurality of synapses for setting strengths coupling said respective neurons.

13. A noise detector comprising:

at least two filters adapted so that a signal is inputted thereto to judge to what extent a noise signal is included in said input signal; and an operation unit adapted for synthetically judging, on the basis of results that said filters have respectively judged, to what extent said noise signal is included in said input signal and for outputting a judgment result, wherein said operation unit comprises:

a plurality of first neurons adapted so that results that said filters have respectively judged are given thereto to respectively compare them with predetermined criteria to output first comparison results;

a plurality of first synapses adapted for setting strengths coupling said first neurons and second neurons by carrying out weighting, said second neurons adapted so that said first comparison results outputted from said first neurons and weighted by said first synapses are respectively given thereto to respectively compare them with predetermined criteria to output second comparison results; and a plurality of second synapses adapted for setting strengths coupling said second neurons and a third neuron by carrying out weighting, said third neuron adapted so that said second comparison results outputted from said second neurons and weighted by said second synapses are given thereto to compare them with a predetermined criterion to synthetically judge to what extent said noise signal is. included in said input signal to output a judgment result.

14. A noise reduction device comprising:

a noise canceller unit adapted so that a signal is input thereto to output a signal obtained by subtracting, from said input signal, a component within a predetermined frequency band of said input signal and below a predetermined level;

a noise detector including at least two filters adapted so that said input signal is inputted thereto to judge to what extent said noise signal is included in said input signal, and an operation unit for synthetically judging, on the basis of results that said filters have respectively judged, to what extent said noise signal is included in said input signal; and control means for controlling a characteristic of said noise canceller unit on the basis of a result that said operation unit has judged.

15. A noise reduction device comprising:

a noise canceller unit adapted so that a signal is inputted thereto to output a signal obtained by subtracting, from said input signal, a component within a predetermined frequency band of said input signal and below a predetermined level;

a noise detector including at least two filters adapted so that said input signal is inputted thereto to respectively judge whether or not a noise signal is included in said input signal, or to what extent said noise signal is included in said input signal, and an operation unit for synthetically judging, on the basis of results that said filters have respectively judged, to what extent said noise signal is included in said input signal; and switching means operative such that when said operation unit has judged that said noise signal is included in said input signal, or it has judged that the degree of noise signals included in said noise signal is above a predetermined level, said switching means allows said noise canceller unit to be operative, while when said operation unit has judged that the degree of noise signals included in said input signal is not above said predetermined level, said switching means allows said noise canceller unit to be inoperative.

16. A noise reduction device comprising:

a comb filter adapted so that a signal is inputted thereto to output a signal obtained by compressing a non-correlative component by using another signal correlative with said input signal;

a noise detector including at least two filters adapted so that said input signal is inputted thereto to judge to what extent said noise signal is included in said input signal, and an operation unit for synthetically judging, on the basis of results that said filters have respectively judged, to what extent said noise signal is included in said input signal; and control means for controlling a characteristic of said comb filter on the basis of a result that said operation unit has judged.

17. A noise reduction device comprising:

a comb filter adapted so that a signal is inputted thereto to output a signal obtained by compressing a non-correlative component by using another signal correlative with said input signal;

a noise detector including at least two filters adapted so that said input signal is inputted thereto to judge to what extent said noise signal is included in said input signal, and an operation unit for synthetically judging, on the basis of results that said filters have respectively judged, to what extent said noise signal is included in said input signal; and switching means operative such that when said operation unit has judged that the degree of noise signals included in said input signal is above a predetermined value, said switching means allows said comb filter to be operative, while when said operation unit has judged that the degree of noise signals included in said input signal is not above said predetermined value, said switching means allows said comb filter to be inoperative.

18. A noise detector comprising:

at least one filter adapted so that a signal is inputted thereto to judge whether or not a noise signal is included in said input signal, and also at least one filter adapted so that said input signal is inputted thereto to judge to what extent said noise signal is included in said input signal; and an operation unit adapted for synthetically judging, on the basis of results that said filters have respectively judged, to what extent said noise signal is included in said input signal and to output a judgment result, wherein at least one of said filters carries out a judgment such that a component within a predetermined frequency band of said input signal and below a predetermined level is considered to be said noise signal.

19. A noise detector comprising:

at least one filter adapted so that a signal is inputted thereto to judge whether or not a noise signal is included in said input signal, and also at least one filter adapted so that said input signal is inputted thereto to judge to what extent said noise signal is included in said input signal; and an operation unit adapted for synthetically judging on the basis of results that said filters have respectively judged, to what extent said noise signal is included in said input signal and to output a judgment result, wherein at least one of said filters is operative to delay another signal correlative with said input signal to carry out a judgment such that a component having no correlation between the delayed another signal and said input signal is considered to be said noise signal.

20. A noise detector comprising:

at least one filter adapted so that a signal is inputted thereto to judge whether or not a noise signal is included in said input signal, and also at least one filter adapted so that said input signal is inputted thereto to judge to what extent said noise signal is included in said input signal; and an operation unit adapted for synthetically judging, on the basis of results that said filters have respectively judged, to what extent said noise signal is included in said input signal and to output a judgment result, wherein at least one of said filters is operative to delay another signal correlative with said input signal to extract a component having no correlation between the delayed another signal and said input signal to carry out a judgment such that a component less than a predetermined level of the extracted component is considered to be said noise signal.

21. A noise detector comprising:

at least one filter adapted so that a signal is inputted thereto to judge whether or not a noise signal is included in said input signal, and also at least one filter adapted so that said input signal is inputted thereto to judge to what extent said noise signal is included in said input signal: and an operation unit adapted for synthetically judging, on the basis of results that said filters have respectively judged, to what extent said poise signal is included in said input signal and to output a judgment result, wherein when said input signal is a video signal, said noise detector further comprises a filter adapted for making a comparison between brightness of a picture indicated by said video signal and a predetermined value to output a comparison result, said operation unit being operative to synthetically judge, on the basis of results that said filters have respectively judged, to what extent said noise signal is included in said input signal and to output a judgment result.

22. A noise detector comprising:

at least one filter adapted so that a signal is inputted thereto to judge whether or not a noise signal is included in said input signal, and also at least one filter adapted so that said input signal is inputted thereto to judge to what extent said noise signal is included in said input signal; and an operation unit adapted for synthetically judging, on the basis of results that said filters have respectively judged, to what extent said noise signal is included in said input signal and to output a judgment result, wherein said operation unit includes a neural network system comprising a plurality of neurons, and a plurality of synapses for setting strengths coupling said respective neurons.

23. A noise detector comprising:

at least one filter adapted so that a signal is inputted thereto to judge whether or not a noise signal is included in said input signal, and also at least one filter adapted so that said input signal is inputted thereto to judge to what extent said noise signal is included in said input signal; and an operation unit adapted for synthetically judging, on the basis of results that said filters have respectively judged, to what extent said noise signal is included in said input signal and to output a judgment result, wherein said operation unit comprises:

a plurality of first neurons adapted so that results that said filters have respectively judged are given thereto to respectively compare them with predetermined criteria to output first comparison results;

a plurality of first synapses adapted for setting strengths coupling said first neurons and second neurons by carrying out weighting, said second neurons adapted so that said first comparison results outputted from said first neurons and weighted by said first synapses are respectively given thereto to respectively compare them with predetermined criteria to output second comparison results; and a plurality of second synapses adapted for setting strengths coupling said second neurons and a third neuron by carrying out weighting, said third neuron adapted so that said second comparison results outputted from said second neurons and weighted by said second synapses are given thereto to compare them with a predetermined criterion to synthetically judge to what extent said noise signal is included in said input signal to output a judgment result.

24. A noise reduction device comprising:

a noise canceller unit adapted so that a signal is input thereto to output a signal obtained by subtracting, from said input signal, a component within a predetermined frequency band of said input signal and below a predetermined level;

a noise detector including at least one filter adapted so that said input signal is inputted thereto to judge whether or not a noise signal is included in said input signal, and also at least one filter adapted so that the input signal is inputted thereto to judge to what extent said noise signal is included in said input signal, and an operation unit for synthetically judging, on the basis of results that said filters have respectively judged, to what extent said noise signal is included in said input signal; and control means for controlling a characteristic of said noise canceller unit on the basis of a result that said operation unit has judged.

25. A noise reduction device comprising:

a noise canceller unit adapted so that a signal is inputted thereto to output a signal obtained by subtracting, from said input signal, a component within a predetermined frequency band of said input signal and below a predetermined level;

a noise detector including at least one filter adapted so that said input signal is inputted thereto to judge whether or not a noise signal is included in said input signal, and also at least one filter adapted so that said input signal is inputted thereto to judge to what extent said noise signal is included in said input signal, and an operation unit for synthetically judging, on the basis of results that said filters have respectively judged, to what extent said noise signal is included in said input signal; and switching means operative such that when said operation unit has judged that said noise signal is included in said input signal, or it has judged that the degree of noise signals included in said noise signal is above a predetermined level, said switching means allows said noise canceller unit to be operative, while when said operation unit has judged that the degree of noise signals included in said input signal is not above said predetermined level, said switching means allows said noise canceller unit to be inoperative.

26. A noise reduction device comprising:

a comb filter adapted so that a signal is inputted thereto to output a signal obtained by compressing a non-correlative component by using another signal correlative with said input signal;

a noise detector including at least one filter adapted so that said input signal is inputted thereto to judge whether or not a noise signal is included in said input signal, and at least one filter adapted so that said input signal is inputted thereto to judge to what extent said noise signal is included in said input signal, and an operation unit for synthetically judging, on the basis of results that said filters have respectively judged, to what extent said noise signal is included in said input signal; and control means for controlling a characteristic of said comb filter on the basis of a result that said operation unit has judged.

27. A noise reduction device comprising:

a comb filter adapted so that a signal is inputted thereto to output a signal obtained by compressing a non-correlative component by using another signal correlative with said input signal;

a noise detector including at least one filter adapted so that said input signal is inputted thereto to judge whether or not a noise signal is included in said input signal, and at least one filter adapted so that the input signal is inputted thereto to judge to what extent said noise signal is included in said input signal, and an operation unit for synthetically judging, on the basis of results that said filters have respectively judged, to what extent said noise signal is included in said input signal; and switching means operative such that when said operation unit has judged that the degree of noise signals included in said input signal is above a predetermined value, said switching means allows said comb filter to be operative, while when said operation unit has judged that the degree of noise signals included in said input signal is not above said predetermined value, said switching means allows said comb filter to be inoperative.

* * * * *